C. H. CASTLE.
HEATING-STOVE.
No. 6,966. Reissued Feb. 29, 1876.
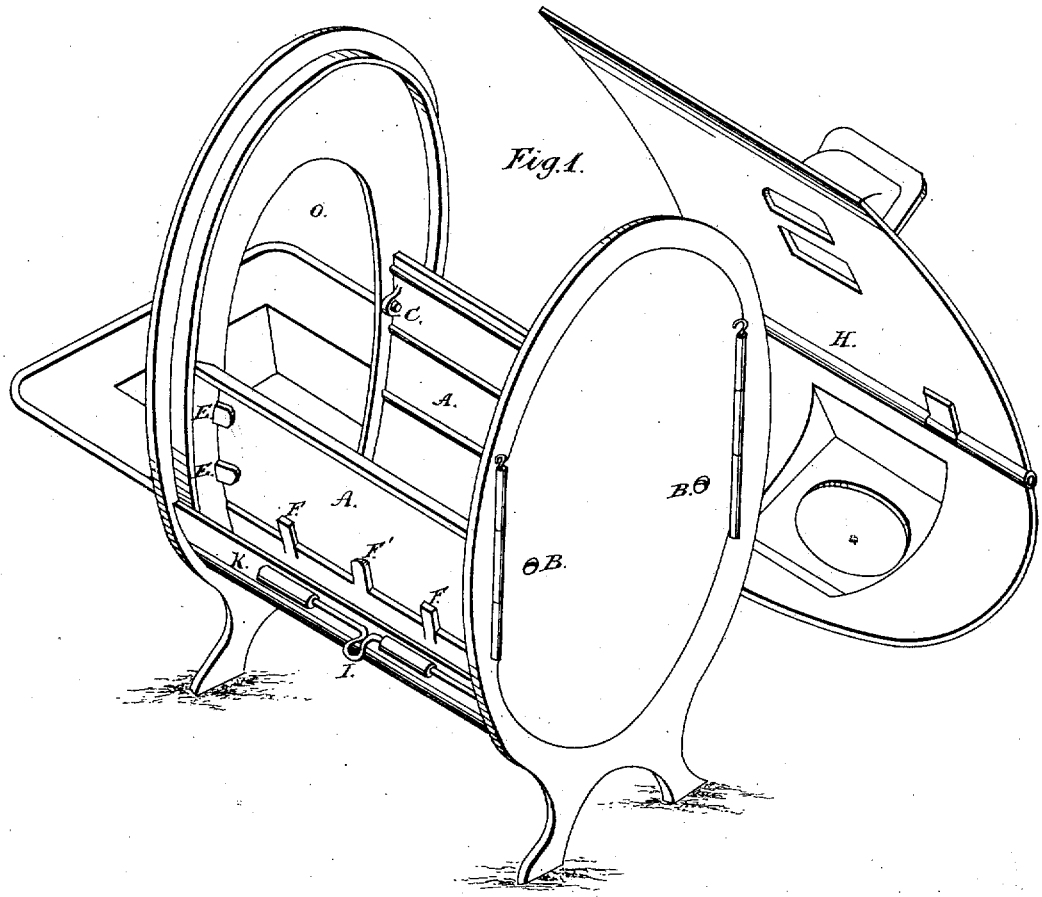
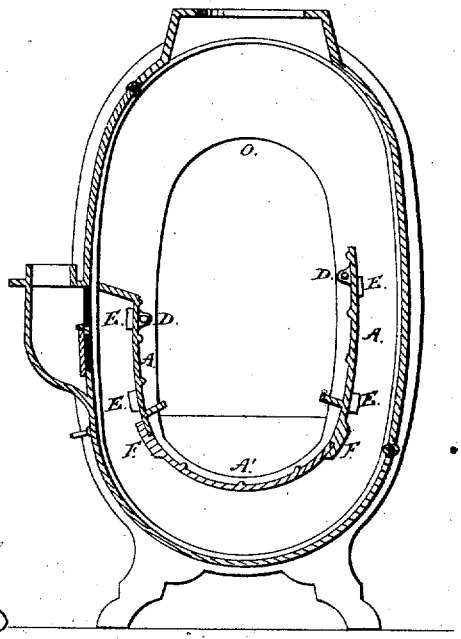
Fig. 2.
Witnesses:
Chas. C. Gill
Fred. R. Goodridge
Inventor:
Chauncey H. Castle
by his Attys.
Cox & Cox
N. PETERS, PHOTO-LITHOGRAPHER, WASHINGTON, D. C.

UNITED STATES PATENT OFFICE.

CHAUNCEY H. CASTLE, OF QUINCY, ILLINOIS, ASSIGNOR TO COMSTOCK, CASTLE & CO.

IMPROVEMENT IN HEATING-STOVES.

Specification forming part of Letters Patent No. 162,624, dated April 27, 1875; reissue No. 6,966, dated February 29, 1876; application filed August 7, 1875.

*To all whom it may concern:*

Be it known that I, CHAUNCEY H. CASTLE, of Quincy, Adams county, Illinois, have invented certain new and useful Improvements in Heating-Stoves, of which the following is a description, reference being had to the accompanying drawings.

The invention relates to that class of stoves which consist of a sheet-iron barrel or cylinder, the ends of which rest upon heads or plates provided with a rim or flange to receive the barrel, a series of ears being provided within the plates and near the center thereof to sustain the cast-iron linings in such manner as to leave an opening between the barrel and linings of the stove. The present invention consists in providing such a stove with a removable cast-iron lining, which may be readily taken out or replaced, when desired, through the door of the stove, and is further intended to obviate the present difficulty experienced in so securing the lining that it can be conveniently removed or inserted and secured in place. This object is effected by providing any convenient attachment or fastening, which, while holding the lining in contact with the interior series of ears as aforesaid, secures in position or permits the ready removal of the linings as desired, all as hereinafter more fully detailed.

In the accompanying drawings, Figure 1 is a perspective view of an embodiment of the invention, and Fig. 2 a transverse central sectional elevation of same.

A is the lining, formed in convenient plates, as shown, and in the present instance provided on the inside, near their upper corners, with the ears C, through which pass the screws or bolts B, provided near their interior ends with the nuts D. This arrangement serves to keep the upper part of the plate A in position, it being sustained by its base resting upon the edge of the bottom plate A′ below, though the bolt B may in a degree sustain the plate. It is, however, clear that the true purpose of this part of the invention is to hold the plates in such position that they are in contact with the ears E with which the end plates are provided at a suitable distance within their edges. Hence the ears C can be dispensed with, and the bolt B be made to impinge upon the plate A, holding it against the ear E, or any other removable device can be used which will effect the above result without departing from the scope of the invention, the object of which is to secure the movable lining against the ears E.

The lower edge of the plate A is in present instance provided with the flanges F, which fit on the outside of the bottom plate, the flange F′ on which fits upon the outside of the plate above. This is a convenient means of securing the lower edge of the plate in place, but it is evident that the weight of the plate A might sustain it in position without the presence of the flanges F F′, for which many other substitutes may be adopted.

To remove the plate A, or any one thereof, it is only necessary to take off the nuts D, withdraw the bolts C, bend the plate toward the center of the stove, when it may be taken out through any orifice of suitable size in the top or ends of the stove-barrel.

The side plates being removed, or one of them, to remove the bed-plate it is only necessary to raise and withdraw it. H is the outside body of the stove, which in the present instance is hinged and provided with the bolt I and socket K, so that it may be carried over, thus exposing the whole of the lining, or restored to its place and locked at pleasure. By this arrangement the outside body may be attached before the lining is inserted, or the lining, when secured as above described, removed without inconvenience. In lieu thereof, any other arrangement which effects a like result may be employed. Thus a section of the back of the stove may be constructed to slide or fold, as shown in Fig. 1, whereby the lining may be inserted or readily removed and repaired when out of order.

One great and very desirable advantage obtained in the construction and use of a stove of the above described kind is that the workman can adjust the linings in proper position after the sheet-iron body has been put on and the parts composing the stove fastened together, and also in the fact that when the old lining has become worn and useless, new lining can be replaced without moving the stove from its usual position or taking down the pipe.

I do not allege or claim that my invention is novel in its application to stoves of every description which have a sheet-metal body, but only to that class which are made with a horizontal body of sheet metal and with heads of cast metal, and the linings of which are so arranged that the products of combustion pass around and under them before escaping, the said class being commonly known as "Todd stoves."

I do not confine myself to any particular form or manner of practicing the invention; but What I do claim, and desire to secure by Letters Patent, is—

1. The plates A, provided with the flanges F and F′, in combination with a stove having apertures of a suitable size to permit the removal of the plates, and provided with the ears E and C, and the plates held in position by the bolts B.

2. An improvement in Todd stoves, consisting of a lining made in one or more pieces separated from and combined with the stove-barrel or outer casing, to afford a space for the passage of the products of combustion between said lining and barrel, the said lining being capable of insertion into or removal from the stove without displacing any other portion of the stove.

3. An improvement in Todd stoves, consisting of a bottom plate separated from and combined with the stove-barrel to afford a space for the passage of the products of combustion between the plate and barrel, said plate being capable of insertion or removal, without displacing any other portion of the stove except the side-lining plate or plates.

4. An improvement in Todd stoves, consisting of a lining plate or plates separated from and combined with the stove-barrel to afford a passage for the products of combustion between the plate and barrel, and having a removable attachment operating against the lining-plate, which plate can be inserted or removed without displacing any other part of the stove except the removable attachment.

CHAUNCEY H. CASTLE.

Witnesses:

JOEL R. WOODRUFF,

J. SEYMOUR CASTLE.